United States Patent [19]

Vest, Jr.

[11] 3,728,848
[45] Apr. 24, 1973

[54] HIGH PRESSURE BLOW-OFF VALVE PROTECTOR
[76] Inventor: James C. Vest, Jr., 142 Brentwood Boulevard, Lafayette, La. 70501
[22] Filed: Sept. 17, 1971
[21] Appl. No.: 181,496

[52] U.S. Cl...................................55/387, 138/89.2
[51] Int. Cl...........................B01d 53/04, F16l 55/10
[58] Field of Search..................................55/387, 74; 138/89.3, 89.4, 89.1, 89.2; 220/44 A; 285/345

[56] References Cited
UNITED STATES PATENTS 1,628,440   5/1927   Smithers.............................138/89.4
2,614,650   10/1952  Chandler et al........................55/387

Primary Examiner—Charles N. Hart
Attorney—A. Yates Dowell, Jr.

[57] ABSTRACT

Apparatus mountable on the vent pipe of a high pressure blow-off valve for excluding foreign materials from the vent pipe and the blow-off valve and for maintaining a dry atmosphere within the vent pipe to minimize oxidation.

4 Claims, 3 Drawing Figures

Patented April 24, 1973

3,728,848

INVENTOR

James C. Vest, Jr.

BY
ATTORNEYS 3,728,848

HIGH PRESSURE BLOW-OFF VALVE PROTECTOR

BACKGROUND OF THE INVENTION

1. Field of the Invention

This invention relates generally to protection devices of various kinds and relates particularly to protection devices for vent pipes and relief valves used in high pressure fluid systems.

2. Description of the Prior Art

Heretofore many protection devices, including hoods or other covers, have been provided for vent pipes of various kinds to exclude foreign material such as rain, snow, dirt and the like. In vent pipes connected to blow-off valves or relief valves, the mere placing of a hood or cover over the end of the pipe has not been sufficient since airborne dust and moisture in the atmosphere have entered the pipe and caused a build-up of foreign matter as well as oxidation of the interior of the vent pipe and the valve members so that the valve has failed to function at the preset pressure for which it is intended.

Many protection devices have been provided for protecting tubular elements such as gun barrels and internal combustion engine exhaust pipes from oxidation by the use of a desiccant. However, most of these devices have been forced into the bore of the device and had to be physically removed before the device could be operated. Some examples of this type of structure are the U.S. Pats. to Lockwood, No. 2,465,163; G. E. Gibson No. 2,557,277; and Cigliano, No. 3,182,436.

Some efforts have been made to place the desiccant in a high pressure fluid line for removing moisture from the fluid flowing through the line, such as the U.S. Pat. to E. O. Gibson, Jr., No. 3,008,540. However, this unit must be replaced periodically and the desiccant must be treated to remove the absorbed moisture.

SUMMARY OF THE INVENTION

The present invention includes a protector cap adapted to be frictionally mounted on the vent pipe of a high pressure blow-off valve in an airtight manner to exclude foreign matter from the vent pipe but which can be readily removed by high pressure within the system when the blow-off valve or relief valve is operated to relieve pressure within the system. Preferably a desiccant is mounted within the protector cap to maintain a dry atmosphere within the vent pipe and valve structure to substantially reduce oxidation and to insure that the blow-off valve will operate at the preset pressure.

It is an object of the invention to provide a protective cap for the vent line of a high pressure fluid system which will exclude foreign material from such vent pipe.

Another object is to provide a vent pipe protective cap having a desiccant located therein for absorbing moisture contained in the air trapped within such vent pipe.

DESCRIPTION OF THE PREFERRED EMBODIMENT

Figure 1:
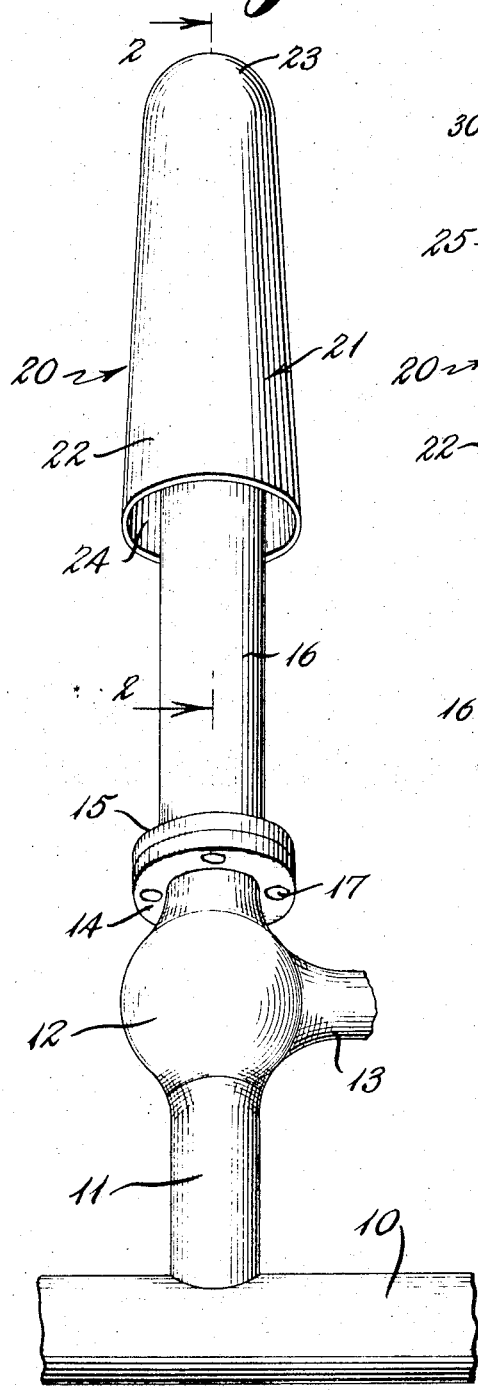
FIG. 1 is a perspective illustrating one application of the invention.

With continued reference to the drawing, a high pressure fluid system having a high pressure line 10 is provided with a branch line 11 in which a blow-off valve or pressure relief valve 12 is mounted. Due to the high pressures within the system, the lines 10 and 11, as well as the valve 12, normally are constructed of steel or other ferrous material. The valve 12 is preset to open at a predetermined pressure so that in the event of a rise in pressure within the system to a predetermined value, the blow-off valve 12 will open and exhaust the fluid within the system to relieve the pressure. This valve is a safety feature and is conventional in most high pressure systems.

If desired the valve 12 can be provided with a branch line 13 on which a conventional pressure indicator gauge can be located to indicate the pressure within the system. Normally the blow-off valve 12 is provided with a flange 14 on the discharge side and such flange is connected to a flange 15 carried by a vent pipe 16 in any desired manner, as by fasteners 17. The structure thus far described is conventional in the prior art and forms no part of the present invention.

In order to protect the vent pipe 16 and to keep foreign matter, such as rain, snow, dirt and the like, from entering the vent pipe 16, as well as to substantially reduce oxidation within the vent pipe and the blow-off valve 12, a protector 20 is provided which is adapted to be forced onto the vent pipe in an airtight manner but which is removed by pressure from within the system when the valve 12 opens. The protector 20 includes a cap 21 having a generally tubular side wall 22 closed at one end by a substantially spherical end wall 23 in such a manner that one end of the cap is sealed while the opposite end is open. Preferably at least the inner surface 24 of the side wall 22 is of tapered or frusto-conical configuration.

In order to mount the cap 21 on the free end of the vent pipe 16, a collar 25 of resilient material, such as soft rubber or soft closed-cell foam material, is provided having an internal bore 26 of a diameter slightly less than the external diameter of the vent pipe 16 and an outer surface 27 of a configuration generally complementary to the inner surface 24 of the cap 21. The collar 25 is expanded slightly when it is applied to the vent pipe 16 and is permitted to contract into frictional engagement throughout the length of the bore 26 on the vent pipe 16. Preferably the upper end of the collar 25 is located substantially flush with the free end of the vent pipe 16.

In areas having a substantial amount of humidity or moisture in the atmosphere, it is desirable to remove the moisture from the air trapped in the vent pipe 16 when the cap 21 is applied to substantially reduce or eliminate oxidation in the ferrous vent pipe as well as the valve 12 which may interfere with the proper operation of the valve. In order to do this, a desiccant 28 of calcium chloride, silica gel or the like is provided in the spherical end portion 23 on the interior of the cap 21. As illustrated, the desiccant is in crystalline or granular form contained within a fabric bag or other flexible container 29 which can assume the shape of the inner surface of the end wall 23.

Figure 2:
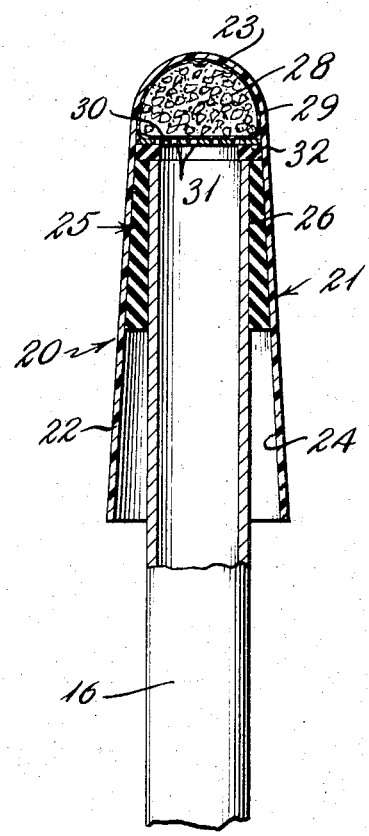
FIG. 2 is a section on the line 2—2 of FIG. 1.
Figure 3:
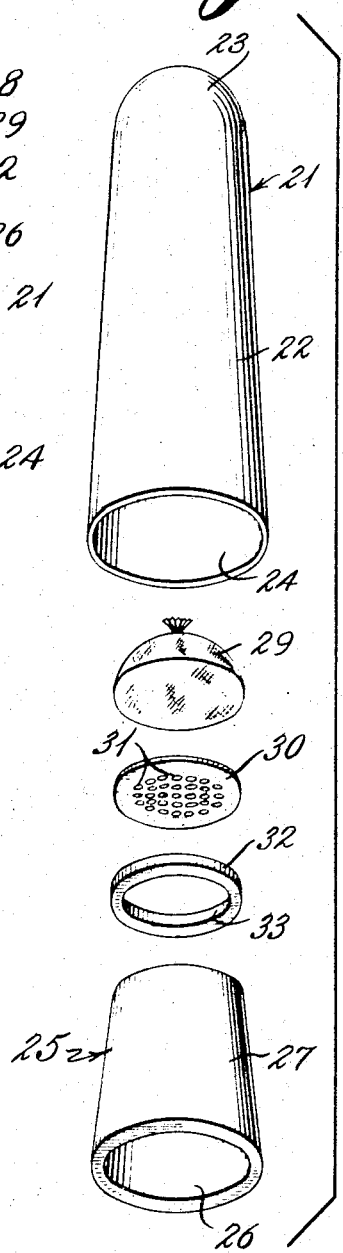
FIG. 3 is an exploded perspective of the apparatus of the present invention.

A flat disk 30 having perforations or openings 31 extending entirely therethrough is adapted to be received within the cap 21 and rest against the bottom of the bag 29 to prevent the desiccant from falling into the vent pipe 16 when installed in a substantially vertical position, as illustrated in FIGS. 1 and 2. A washer 32 of resilient material such as soft rubber or the like, is disposed below the disk 30. The outer periphery of the washer 32 frictionally engages the upper portion of the inner surface 24 of the cap 21 to retain the desiccant bag 29 and the disk 30 in position until the cap 21 is applied to the end of the vent pipe 16.

Preferably the washer 32 has a central bore 33 of substantially the same diameter as the inner diameter of the vent pipe 16 so that the washer 32 will engage the upper edge of the vent pipe when the cap is applied to function as a secondary seal to insure that no atmospheric air can enter or leave the vent pipe 16. The moisture contained in the air trapped within the vent pipe when the cap is applied is absorbed by the desiccant.

It is noted that although a fabric bag of desiccant crystals or granular material has been illustrated and described, it is contemplated that a cake of desiccating material could be shaped to the configuration of the inner surface of the end wall 23 in which case the fabric bag could be eliminated. Also it is contemplated that if the openings in the disk 30 are small enough to prevent the passage of desiccant crystals, a predetermined quantity of loose desiccant crystals could be poured into the end of the cap 21 and the disk 30 could be placed directly on such crystals.

In the operation of the device, the inner bore 26 of the collar 25 is expanded slightly and is placed around the upper end of the vent pipe 16 after which the inner bore 26 is permitted to contract into intimate engagement with the outer surface of the vent pipe. The desiccant 28 is placed in the closed end of the cap 21 after which the disk 30 and washer 32 are inserted to hold the desiccant in position. Thereafter the cap 21 is forced downwardly over the end of the vent pipe 16 so that the inner surface 24 of the cap frictionally engages the outer surface 27 of the collar. Continued downward movement of the cap, preferably with a twisting action, compresses the material of the collar 25 and forms an airtight seal between the inner surface 24 of the cap and the outer surface of the vent pipe 16. The desiccant 28 absorbs moisture within the air trapped in the vent pipe 16 to substantially prevent oxidation from occurring within that pipe. Since the blow-off valve 12 normally is closed, the desiccant 28 has no effect on the material carried within the high pressure line 10. If pressure within the line 10 reaches a predetermined value controlled by the blow-off valve 12, such valve opens and high pressure fluid from the line 10 enters the vent pipe 16. When the pressure within the vent pipe is sufficient to overcome the frictional gripping action between the cap 21 and the collar 25, the cap is blown off so that the high pressure line 10 is vented to the atmosphere.

It is contemplated that a protector cap would be provided for any desired size of vent pipe and has been found particularly useful for use with a vent pipe having an internal diameter of 6 inches, in which the collar 25 is approximately 7 inches long and the cap 21 is approximately 18 inches long.

I claim:

1. A protector for excluding foreign materials from the vent pipe of a high pressure system, said protector comprising an elongated resilient collar having an internal bore for mounting on the outer periphery of said vent pipe, the outer surface of said collar having a frusto-conical configuration tapering downwardly and outwardly at a predetermined angle, a cap having a side wall with an end wall at one end thereof, the opposite end of said cap being open, the inner surface of said side wall being tapered at an angle substantially complementary to the outer surface of said collar for frictionally engaging and compacting said resilient collar to form an airtight connection between said cap and said vent pipe, whereby fluid under pressure in said vent pipe overcomes the frictional gripping action between said collar and said cap to remove said cap from said collar so that the fluid under pressure within the vent pipe is exhausted to atmosphere.

2. The structure of claim 1 including a desiccant located within said cap adjacent to said end wall and in communication with the interior of the vent pipe for absorbing moisture from the air trapped within the vent pipe when said cap is applied.

3. The structure of claim 2 including perforated disk means for retaining said desiccant within said cap.

4. A protector for excluding foreign matter and moisture from the vent pipe of a high pressure system blow-off valve, said protector comprising an elongated resilient collar having a generally cylindrical axial bore, said bore extending entirely through said collar and being of a size to be sealed onto the outer periphery of the vent pipe, the outer surface of said collar having a frusto-conical configuration tapering downwardly and outwardly, a cap having an elongated side wall with an end wall at one end thereof, the inner surface of said side wall being tapered at an angle substantially complementary to the outer surface of said collar for frictionally engaging and compacting said resilient collar to form an airtight connection between said cap and the vent pipe, a resilient washer mounted on the open end of said vent pipe and having an outer periphery of a size to engage the inner surface of the side wall of said cap, a perforated disk mounted on said washer, and a desiccant located within said cap adjacent to said end wall and engageable with said perforated disk, whereby downward movement of said cap causes said desiccant to apply pressure to said disk and compress said washer against the end of the vent pipe and said desiccant absorbs moisture from the air trapped within the vent pipe.

* * * * *